UNITED STATES PATENT OFFICE.

WALTER G. MURPHY, OF NEW YORK, N. Y.

METHOD OF TRANSPORTING LIVE FISH.

SPECIFICATION forming part of Letters Patent No. 360,391, dated March 29, 1887.

Application filed October 27, 1886. Serial No. 217,380. (No specimens.)

*To all whom it may concern:*

Be it known that I, WALTER G. MURPHY, of the city, county, and State of New York, have invented an Improved Method of Transporting Fish Alive, of which the following is a specification.

My invention relates to the preservation of live fish in a state of captivity, and has for its object the saving of time, labor, and expense involved where the water is required to be constantly changed or means are employed to supply air to the same.

I have found that by my invention the water need be changed only at long intervals, where in the old way a constant watch and change of the water are required.

Heretofore, in the transportation of live fish for fish-culture, for food, and for sporting purposes, (as, for instance, live bait,) no practical means has yet been found by which live fish may be carried from one place to another without loss either in transportation or upon arrival at the point of destination. The ordinary method of transporting live fish has been to place the fish in cans of water having perforated covers for the admission of air; but this has proved ineffectual, as generally some, if not all, of the fish perish while being conveyed from one point to another, or are in such a condition upon arrival as to die afterward. Other devices have been resorted to with apparatus to keep the water fresh; but they are expensive and cumbersome and do not meet the requirement of an easy and effective means for carrying live fish any distance, to be in as good condition upon arrival as when they were sent.

My invention consists in partly filling suitable receptacles with water, so as to leave an air-space, placing live fish therein, and hermetically sealing the receptacle.

My invention further consists in employing compressed air in the receptacle.

In carrying out my invention I take the number of vessels or receptacles required, which may be of any suitable material, as metal, glass, or earthenware, in the shape of cans, jars, bottles, or otherwise, and fill them about two-thirds full of water, so as to leave an air-space when the receptacle is closed. The live fish are then placed in the water and the receptacle covered and hermetically sealed in any suitable and well-known manner. By excluding all air except that inclosed in the receptacle it is found that live fish may be conveyed any distance, and that they will be in as good condition and as lively upon arrival as when they were sent.

Two methods are now commonly employed to preserve fish *in transitu*, one being to continually force air into the water and the other to change the water, generally by an attendant. The former requires cumbersome mechanism and is expensive. The latter involves much labor and trouble and does not avoid loss of some, if not the greater portion, of the fish, especially if they are not of a hardy species. My method dispenses with any special mechanism and avoids the labor and trouble of changing the water, besides bringing all of the fish to their destination in good condition. I have found that if the air inclosed above the water in the receptacle be compressed when the vessel is sealed it aids in the preservation of the life of the fish, and is especially beneficial in carrying fish that live at a depth where there is greater pressure of the water, as in the case of deep-sea fish. The amount of compressed air supplied may be regulated according to the kind of fish to be transported. If the air be compressed, which can be done in any well-known manner, it is advisable to use a receptacle with a narrow opening at top and gradually widening as far as the surface of the water. The air may be compressed by forcing in a stopper or cork, taking care to exclude the outer air, and then hermetically sealing the receptacle. It is often necessary to keep the contents of the receptacle cool, especially with certain kinds of fish and in warm weather. For this purpose earthenware receptacles are employed. For scientific purposes, for breeding and sporting purposes—*e. g.*, carrying live bait—the result attained by this means will be found invaluable, in addition to its simplicity and inexpensiveness.

I make no claim in this application for the product—viz., a receptacle partly filled with water containing live fish and hermetically sealed, and, in addition, a receptacle partly filled with water containing live fish and compressed air and hermetically sealed, and, further, in a receptacle partly filled with water containing live fish and compressed air and hermetically sealed and having an air-pump attachment—but claim the product in a separate application now pending, filed February 12, 1887, Serial No. 227,397.

What I claim, and desire to secure by Letters Patent, is—

1. The method of keeping fish alive during captivity, which consists in placing live fish in receptacles partly filled with water and then hermetically sealing the same, substantially as described.

2. The method of keeping fish alive during captivity, which consists in placing live fish in receptacles partly filled with water, in compressing the air in the remaining space, and hermetically sealing the receptacles, substantially as described.

In testimony whereof I have hereunto subscribed my name.

WALTER G. MURPHY.

Witnesses:
RICHARD E. O'BRIEN,
MAMIE LYNCH.